(12) United States Patent
Linger

(10) Patent No.: US 6,733,221 B2
(45) Date of Patent: May 11, 2004

(54) INSERT NUT FOR A SCREW NUT JOINT

(75) Inventor: Mats Linger, Onsala (SE)

(73) Assignee: Jokab Safety AB, Kungsbacka (SE)

( * ) Notice: Subject to any disclaimer, the term of this patent is extended or adjusted under 35 U.S.C. 154(b) by 0 days.

(21) Appl. No.: 10/281,747

(22) Filed: Oct. 28, 2002

(65) Prior Publication Data
US 2003/0091407 A1 May 15, 2003

Related U.S. Application Data

(63) Continuation of application No. PCT/SE01/00876, filed on Apr. 24, 2001.

(30) Foreign Application Priority Data
Apr. 27, 2000 (SE) .............................................. 0001556

(51) Int. Cl.$^7$ ............................ F16B 27/00; F16B 37/00
(52) U.S. Cl. ...................... 411/84; 411/104; 411/427; 411/553
(58) Field of Search ........................... 411/84, 85, 104, 411/427, 553

(56) References Cited

U.S. PATENT DOCUMENTS

| | | | |
|---|---|---|---|
| 4,575,295 A | * | 3/1986 | Rebentisch .................. 411/85 |
| 4,666,355 A | | 5/1987 | Stover |
| 5,116,161 A | | 5/1992 | Faisst |
| 5,199,836 A | * | 4/1993 | Gogarty ........................ 411/84 |
| 6,086,300 A | * | 7/2000 | Frohlich ...................... 411/84 |

FOREIGN PATENT DOCUMENTS

| | | |
|---|---|---|
| DE | 1018267 | 11/1954 |
| EP | 0478928 A2 | 6/1991 |
| EP | 0928902 A1 | 11/1998 |
| FR | 2132645 | 3/1972 |
| GB | 2029918 A | 9/1979 |

* cited by examiner

Primary Examiner—Neill Wilson
(74) Attorney, Agent, or Firm—Gauthier & Connors, LLP

(57) ABSTRACT

Insert nut for a screw nut joint of the type which comprises a substantially rectangular block, of which the short side substantially corresponds to the width of the outer groove portion in a T-formed groove, which outer groove portion is delimited by side flanges in a profile or the like and which inner groove portion is expanded relative to the outer groove portion. The long side of the insert nut substantially corresponds to the width of the inner groove portion, and which nut by rotation can be transversally positioned and be brought into contact with the underside of the side flanges of the groove. The nut is designed with a substantially quadratic shoulder section, which is arranged concentric with the threaded hole of the nut, and with substantially the same width as the short side of the nut. The shoulder section is intended to cooperate with the side edges of the outer groove portion, and it is divided in the vertical direction in a lower quadratic portion and an upper quadratic portion designed with two diametrically opposed rounded corners.

2 Claims, 2 Drawing Sheets

INSERT NUT FOR A SCREW NUT JOINT

This is a continuation of Application No. PCT/SE01/00876, filed Apr. 24, 2001.

The present invention relates to an insert nut for a screw nut joint of the type which comprises a substantially rectangular block, of which the short side substantially corresponds to the width of the outer groove portion in a T-formed groove, which outer groove portion is delimited by side flanges in a profile or the like and which inner groove portion is expanded relative to the outer groove portion, whereby the long side of the insert nut substantially corresponds to the width of the inner groove portion, and which nut by rotation can be transversally positioned and be brought into contact with the underside of the side flanges of the groove.

THE BACKGROUND OF THE INVENTION AND THE PROBLEM

Insert nuts and screw nut joints of the above-described type are prior known through for example U.S. Pat. No. 5,116,161 and FR 2132645. Both cases are related to so-called parallelogram nuts, which after insertion in the groove can be rotated to a transverse position and maintain in that transverse position during tightening of the screw. Often, the insert nut is hidden by the part in which the screw is arranged and it is difficult to know with certainty that the nut has reach its optimal locking position. During displacement of the nut along the groove, the screw can rotate, whereby the nut to a certain extent can be part of this rotation and be forced out of its locking position. A similar type of nut can also be found in EP 0 478 928, although the document focuses on the threads of the nut, which threads are partly incomplete so that the screw during tightening in the nut is cutting threading for a more reliable locking of the screw in the nut.

Further, the document U.S. Pat. No. 4,666,355 describes a device at an insert nut, which device can hold the nut in position when the screw is screwed into the nut, so that the nut does not lose its position in the groove. The design that is being described to solve this holding is complicated, especially regarding manufacturing, as it comprises several parts which are intended to cooperate with each other.

THE OBJECT OF THE INVENTION AND THE SOLUTION TO THE PROBLEM

The object of the present invention is to provide an insert nut which nut during rotation of the screw is always brought into its optimal, transverse position. Another object of the invention is to provide an insert nut that maintains in its transverse position, even when the nut is displaced along the groove.

These objects have been solved in that the nut is designed with a substantially quadratic shoulder section, which is arranged concentric with the threaded hole of the nut, and with substantially the same width as the short side of the nut, which shoulder section is intended to cooperate with the side edges of the outer groove portion, and that the shoulder section is divided in the vertical direction in a lower quadratic portion and an upper quadratic portion designed with two diametrically opposed rounded corners.

DESCRIPTION OF THE DRAWINGS

In the following, the invention will be more closely described in an embodiment, with reference to attached drawings.

DESCRIPTION OF AN EMBODIMENT

Figure 1:
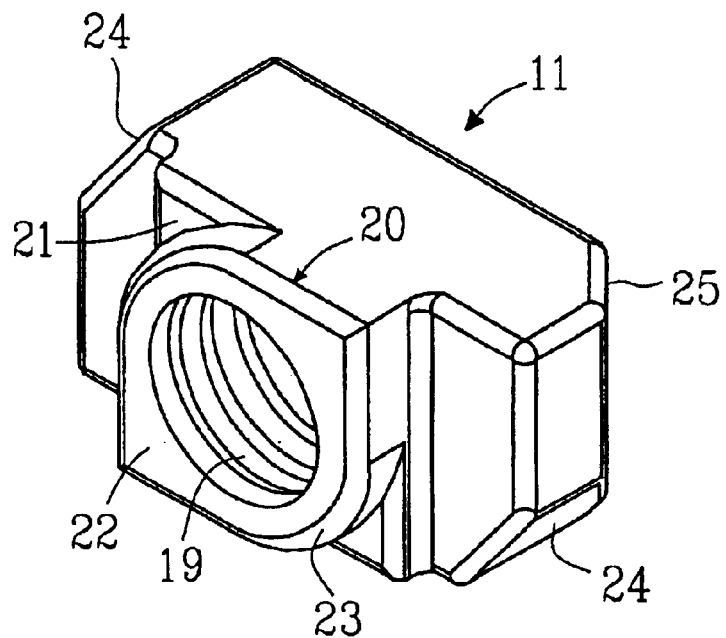
FIGS. 1 and 2 shows a perspective view of the insert nut according to the invention.
Figure 2:
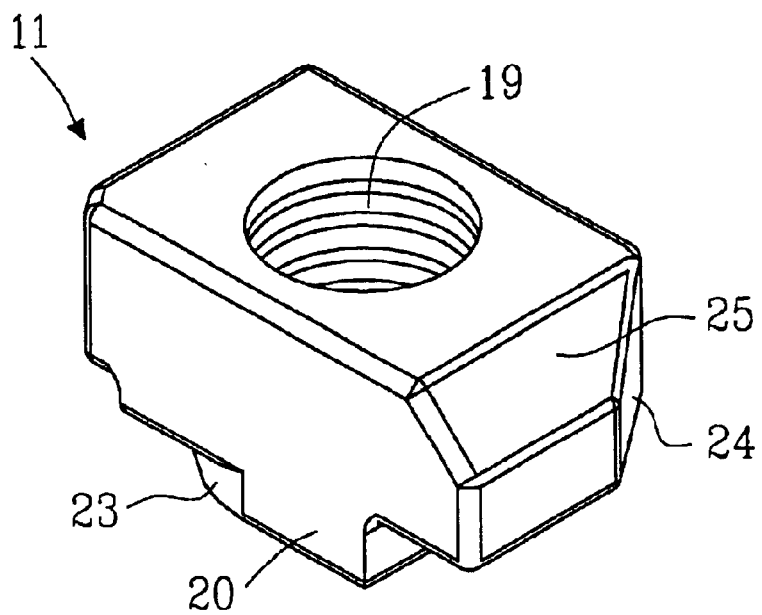
Figure 3:
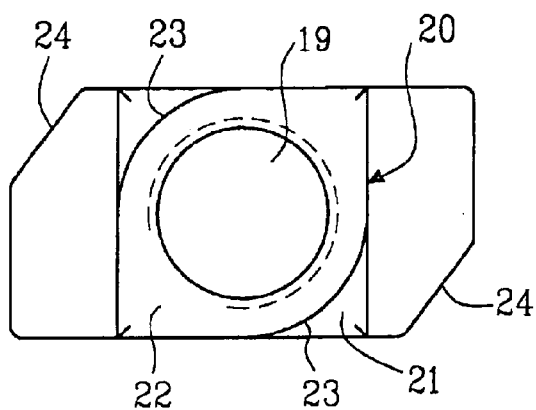
FIGS. 3, 4 and 5 shows the insert nut according to FIG. 1 in a top view, a side view and a front view.
Figure 4:
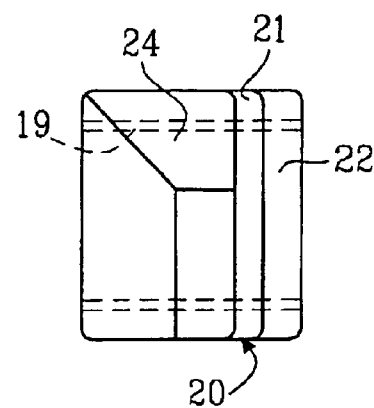
Figure 5:
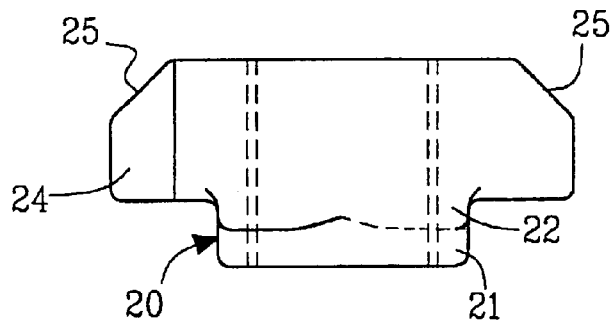
Figure 6:
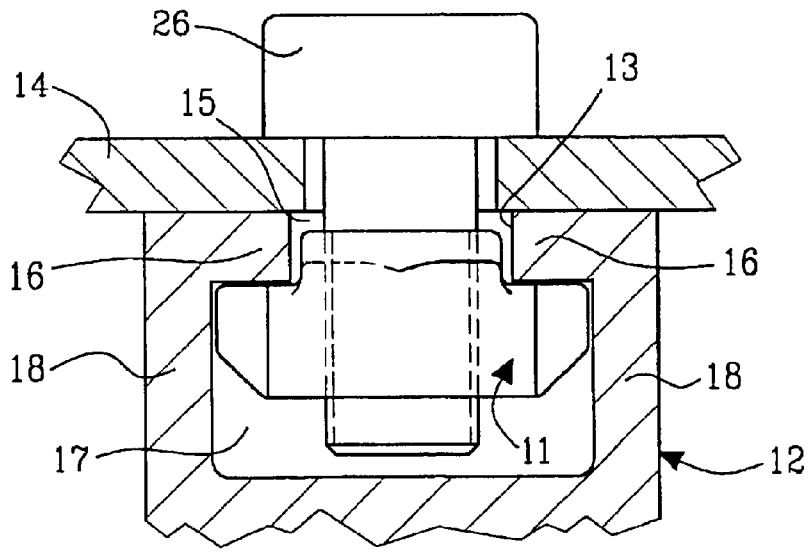
FIG. 6 shows a section through a screw nut joint according to the invention.

The insert nut, denoted 11 in the drawing, is used in such screw nut joints where e.g. a profile rod 12 with a longitudinal groove 13 shall be connected to a another constructive element 14, see FIG. 6. The groove 13 is T-formed and is delimited in the outer groove portion 15 of side flanges 16, whereas the inner groove portion 17 is expanded and is delimited by the side walls 18 of the profile rod 12. The nut 11 consists of a rectangular block, with a central, threaded hole 19. The width of the nut is adapted to the width of the groove 13, so that the nut can be easily inserted into the groove, whereas the length of the nut is adapted to the width of the inner groove portion 17.

As can be seen fin FIGS. 1–5, one of the flat sides of the insert nut 11 is designed with a shoulder section 20 which is concentric with the hole 19, which shoulder section has a substantially quadratic form and a height that is slightly shorter than the thickness of the side flanges 16. In the vertical direction the shoulder section 20 is divided in a lower quadratic portion 21 and an upper "quadratic" portion 22, where two diametrical opposed corners 23 are rounded. Two diametrical opposed corners 24 of the rectangular block are chamfered and the portion of the short side of the nut facing away from the shoulder section 20 is provided with considerable chamfers 25.

When the insert nut 11 is inserted into the groove 13, the nut will be positioned in the longitudinal direction of the groove. At a first tightening of the screw 26, the nut will be lifted as high in the direction of the groove 13, that the upper portion 22 is brought into engagement with the groove 13, whereby the nut 11 can rotate itself 90°, which is possible owing to the rounded corners 23 at the upper portion 22. This rotation can be seen as a confirmation that the screw 26 has been brought into engagement with the nut 11 in a correct way. A such confirmation is most important in cases where a locking device is used that has more than one screw nut joint and where one wants to be sure that all the joints are in force.

At continued tightening of the screw 26, the lower portion 21 of the shoulder section 20 is forced into function, which quadratic form locks the nut position, i.e. prevents the nut from rotating in the groove. Such a rotation is prevented even if the location of the nut is adjusted by displacing the nut 26 along the groove 13. The shoulder section 20 then centres and guides the nut in the groove, so that it will always be brought into a correct locking position, i.e. the transverse position 90° against the longitudinal direction of the groove 13. Thus, the position of the screw nut joint along the groove 13 can be reliably adjusted by slightly unscrewing the screw 26 from the nut, the screw nut joint can be displaced to a desired location along the groove 13 and the screw 26 can be tighten again.

During dismounting of the screw nut joint, the screw 26 is unscrewed a number of turns and the nut is aligned with the groove 13, whereby the nut 11 can be removed from the groove 13.

LIST OF REFERENCE NUMERALS 11 insert nut
12 profile rod 13 groove
14 constructive element
15 outer groove portion
16 side flanges
17 inner groove portion
18 side walls
19 threaded hole
20 shoulder section
21 lower portion
22 upper portion
23 rounded corner
24 chamfered corner
25 chamfer
26 screw

What is claimed is:

1. An insert nut for a screw nut joint of the type which comprises a substantially rectangular block, of which the short side substantially corresponds to the width of the outer groove portion in a T-formed groove, which outer groove portion is delimited by side flanges in a profile or the like and which inner groove portion is expanded relative to the outer groove portion, whereby the long side of the insert nut substantially corresponds to the width of the inner groove portion, and which nut by rotation can be transversally positioned and be brought into contact with the underside of the side flanges of the groove, wherein the nut is designed with a substantially quadratic shoulder section, which is arranged concentric with the threaded hole of the nut, and with substantially the same width as the short side of the nut, which shoulder section is intended to cooperate with the side edges of the outer groove portion, and that the shoulder section is divided in the vertical direction in a lower quadratic portion and an upper quadratic portion designed with two diametrically opposed rounded corners, wherein the side of the nut facing away from the shoulder section is provided with chamfers along its short sides.

2. An insert nut according to claim 1, wherein two of the diametrical opposed corners of the rectangular block are chamfered.

* * * * *